United States Patent Office 3,652,553
Patented Mar. 28, 1972

3,652,553
PROCESS FOR THE PRODUCTION OF
CAPROLACTAM
Manfred Mansmann, Krefeld-Bockum, Otto Immel, Krefeld-Uerdingen, and Hans Zirngibl, Duisburg, Germany, assignors to Farbenfabriken Bayer Aktiengesellschaft, Leverkusen, Germany
No Drawing. Filed Dec. 8, 1969, Ser. No. 883,269
Claims priority, application Germany, Dec. 13, 1968, P 18 14 489.3
Int. Cl. C07d 41/06
U.S. Cl. 260—239.3       2 Claims

ABSTRACT OF THE DISCLOSURE

An improvement for the process to produce lactams by catalytically rearranging cyclic ketoximes by passing a gas mixture consisting of a gaseous cyclic ketoxime and steam or a mixture of a gaseous cyclic ketoxime, steam and an inert gas over a boron oxide catalyst at temperatures of from 200 to 400° C. and recovering the lactam from the gas mixture thus obtained. Before passing the steam over the boron oxide catalyst they are saturated with boron oxide by passing over the X-ray crystalline modification of boron oxide at a temperature of from 200 to 450° C.

---

This invention relates to an improvement in the process for the production of lactams by catalytically rearranging cyclic ketoximes in the gas phase at a temperature of from 200 to 400° C. in the presence of a particular modification of boron trioxide.

It is known that cyclic ketoximes, especially cyclohexanone oxime, can be rearranged into the corresponding lactams in the gas phase at 200 to 400° C. on solid catalysts. Catalysts comprising boric acid or boron oxide on supports have proved to be particularly effective. Proposed supporting materials include aluminium oxide, silica gel, diatomaceous earth, active carbon, titanium dioxide, stannic oxide and alkaline earth metal phosphates and sulphates. For the rearrangement into the lactams, the oxime vapours are passed over these catalysts, with or without inert carrier gases, at elevated temperature and at normal, elevated or reduced pressure. It is also known that water containing oxime may be used for the rearrangement reaction, or the evaporated oxime and steam as a carrier gas may be passed over the catalyst. The presence of steam considerably increases the rearrangement activity of the catalysts.

Unfortunately, the addition of steam, which is so important as to be imperative to the economy of the catalytic rearrangement process, involves a distinct disadvantage by increasing the volatility of the boric acid in the catalyst. It known that both boric acid and boron oxides are volatilised by steam at elevated temperature. Consequently, the $B_2O_3$-content of a catalyst very soon drops to such low levels that the catalyst becomes ineffective and has to be replaced by fresh catalyst.

According to an earlier proposal, cf. Belgian Pat. No. 719,219, the $B_2O_3$ losses can be replenished at regular intervals, especially during the reactivation treatment required to burn off carbon-containing deposits from the catalyst, by pyrolising an orthoboric acid alkyl ester. In this method of regeneration, the boron oxide is reactivated in a special process stage in which the boric acid ester is delivered to the catalyst fluidised by means of an inert gas at a temperature of from 200 to 800° C. The alcohol component of the ester is converted into cracking products of no further value.

It is an object of this invention to provide an improvement in the process for the production of a lactam by passing a mixture of a cyclic ketoxime and steam in the gas phase over a boron oxide catalyst at temperatures of from 200 to 400° C. and recovering the lactams from the gas mixture thus obtained.

This object is accomplished by the improvement which comprises passing said steam over the X-ray crystalline modification of boron oxide at a temperature of from 200 to 450° C. before passing over said catalyst.

By means of this process, it is readily possible continously to keep the $B_2O_3$ content of the catalyst at a constant level, even during the rearrangement reaction. In the process according to the invention, the catalyst may be used either in the form of a fixed bed or in the form of a fluidised bed. The temperature of the crystalline boron oxide may be equal to or even above or below the temperature of the catalyst. The process may be carried out at atmospheric pressure and at elevated or reduced pressure.

Experimental work concerning the volatility of boron oxide in the presence of steam at temperatures of from 200 to 450° C. have shown that the volatility increases with increasing temperature. The amount of boric acid transported is also dependent on the partial steam pressure in such a way that the quantity increases with increasing partial pressure. Under any given rearrangement conditions, the gas stream flowing over the catalyst will become saturated with a particular quantity of boric acid. The boron oxide in the catalyst could be prevented from volatilising by ensuring that the inflowing gas stream already contains the amount of boric acid required for saturation. This means that the gas stream would have to be passed over $B_2O_3$ having substantially the same temperature as that of the catalyst in order to saturate the gas stream with boric acid before it reaches the catalyst. The difficulty here is that the $B_2O_3$ modification normally obtainable, known as vitreous boron oxide slowly softens at temperatures as low as from 250° C. upwards and, at 270° C., is largely molten in form. Consequently, vitreous $B_2O_3$ is not really suitable for saturating the gas stream in commercial operation because vessels of excessively large dimensions would have to be used in order to obtain an adequately large $B_2O_3$ surface. Although it is possible to prevent boron oxide from melting by using an inert supporting material, this would in principle necessitate the preparation of a special catalyst, which is the very thing it is desired to avoid because the price of the catalysts in question is governed less by the costs of the raw materials than by production costs. In addition, the use of boron oxide on a support would be complicated in commercial operation by virtue of the fact that the supporting material would be left behind following volatilisation of the boron oxide and have to be removed before the next run.

Accordingly, the process according to the invention employs the X-ray crystalline modification of boron oxide, which does not have any of the disadvantages referred to above because its melting point is in the range from 450 to 470° C., and because there is no evidence of softening or sintering below the melting point. In addition, volatilised crystalline boron oxide does not leave any residue so that the volatilised component can be replenished simply by adding fresh crystalline boron oxide. Accordingly, the steam required for the rearrangement reaction can readily be saturated with boric acid in the usual way. For example, a saturation tower heated to the required temperature may be filled with pieces of crystalline $B_2O_3$, and the stream of steam or of the mixture of oxime vapour and steam may be passed through. Saturation may alternatively be carried out on the fluidised bed principle. When it is desired to rearrange the oxime in the presence of an inert gas, for example nitrogen or carbon dioxide, it is also possible to pass all or part of the inert gas, together with the steam or oxime/steam mixture, over the crystalline boron oxide.

The quantity of steam is not especially critical and may be varied within wide limits, although the preferred steam component, based on the oxime used, amounts to from 1 to 30% by weight. The X-ray crystalline modification of $B_2O_3$ is known. X-ray crystalline $B_2O_3$ can be obtained from $H_3BO_3$ in accordance with the procedure described in "Handbuch der Präparativen Anorgischen Chemie," published by G. Brauer, second edition, Stuttgart 1960, page 699. Once X-ray crystalline $B_2O_3$ is available, further preparation may be carried out very easily by innoculating an $H_3BO_3$ melt at 225 to 250° C. with a small quantity of X-ray crystalline $B_2O_3$. The melt soon solidifies to give the required crystalline modification of boron oxide, which can be identified either through its melting point or from its characteristic X-ray diagram (crystalline $B_2O_3$ belongs to the trigonal crystal system where $a=4.325$ A. and $c=8.317$ A. as edge lengths of the unit cell).

In carrying out the process according to the invention, it is important to remember that there should be no drops in temperature between saturator and catalyst, because some of the boric acid present in the steam-containing gas stream would be deposited again, corresponding to the equilibrium at the lower temperature. As a result of this, the gas stream flowing over the catalyst would there be resaturated with boric acid, which would be equivalent to a loss of $B_2O_3$ from the catalyst.

In one preferred embodiment of the process according to the invention, the steam is passed over the X-ray crystalline modification of boron oxide at a temperature of from 200 to 450° C., after which the steam is mixed with the oxime vapour at a temperature around the rearrangement temperature and the vapour mixture is subsequently brought into contact with the catalyst. Both the steam and the oxime vapour may be mixed with an inert gas, for example nitrogen or carbon dioxide.

The oxime vapour introduced before the catalyst zone may be substantially free from water. In this instance, the temperature of the crystalline boron oxide in the saturator is kept between 200 and 400° C. and is substantially equal to that of the catalyst. However, if the oxime contains small quantities of water, for example, as a result of the method used for its preparation, the temperature of the crystalline boron oxide can be so far above the temperature of the catalyst that the quantity of boron oxide transported by the oxime-free steam-containing gas stream corresponds to that which can be transported following admixture with the oxime vapour containing small quantities of steam at the temperature of the catalyst. In this case the temperature is limited by the melting temperature of the crystalline $B_2O_3$ (450° C.).

In another preferred embodiment of the process, the steam is passed, together with the oxime vapour, optionally in admixture with inert gas, rather than on its own, over X-ray crystalline boron oxide and then over the catalyst. In this embodiment, precautions need only be taken to ensure that substantially the same temperatures prevail both in the catalyst layer and the boron oxide layer. In this simple embodiment according to the invention of the process, the crystalline boron oxide should lose some of its activity as a result of the deposition on it of carbonaceous products, these carbonaceous products may be removed by burning off. However, they must be burnt off at temperatures below the melting point of the crystalline boron oxide.

One suitable method, for example, comprises gradually burning off the carbonaceous products with oxides of nitrogen. If combustion is carried out in a fluidised bed, nitric acid may be sprayed on to the fluidised $B_2O_3$ particles which have a temperature of from 150 to 450° C., in which instance too high a temperature, and hence fusion of the $B_2O_3$, can readily be prevented because of the evaporating drops of liquid.

No matter what embodiment of the process according to the invention is carried out, the preferred temperature of rearrangement is from 250 to 360° C.

The following examples are to further illustrate the invention without limiting it.

EXAMPLE 1

(a) Without a saturator 245.6 g. of cyclohexanone oxime and 50.0 g. of water were passed for 12 hours at 40 torr over 30 g. of catalyst fixedly arranged in a tubular furnace, which consisted of 12.9% by weight of $B_2O_3$ on titanium dioxide as the support, and which had been heated to 340° C. Subsequently, quantitative determination of the $B_2O_3$ content of the catalyst revealed a value of 8.3% by weight.

|  | Percent |
|---|---|
| Oxime reacted | 91.0 |
| Yield of lactam based on oxime reacted | 95.5 |

(b) With a saturator

The test was carried out as described in (a), except that the steam was passed through a saturator, in the form of a tube which had been filled with granulated crystalline boron oxide and which had been heated to the temperature of the catalyst. In this test, 248.5 g. of cyclohexanone oxime and 54.0 g. of water were passed over the catalyst in a period of 11 hours. Subsequently, quantitative determination of the $B_2O_3$ content revealed that it had risen slightly from 12.9% by weight in the fresh catalyst to 13.7% by weight.

|  | Percent |
|---|---|
| Oxime reacted | 72.0 |
| Yield of lactam based on oxime reacted | 94.5 |

EXAMPLE 2

(a) Without a saturator 376.6 g. of cyclohexanone oxime and 76.3 g. of water, in the form of steam, were passed in a period of 18 hours over 30 g. of a catalyst consisting of 12.9% by weight of $B_2O_3$ on titanium dioxide, at 40 torr/340° C. The catalyst then had deposits of carbon removed from it by heating for 1 hour at 700° C. in air, after which it was reused for rearrangement. Another 132.1 g. of oxime and 25.0 g. of water were passed in vapour form over the catalyst in a period of 5 hours, during which the activity of the catalyst fell to such an extent that the test had to be terminated. Quantitive determination of the $B_2O_3$ content of the catalyst revealed a value of only 2.2% by weight.

|  | Percent |
|---|---|
| Oxime reacted before reactivation | 56.5 |
| Yield of lactam based on oxime reacted | 91.0 |
| Oxime reacted after reactivation | 19.0 |
| Yield of lactam based on oxime reacted | 73.7 |

(b) With a saturator 369.1 g. of cyclohexanone oxime were passed in a period of 16 hours over 30 g. of the same catalyst as in (a) under the same pressure and temperature conditions. At the same time, 71.9 g. of steam were passed during this period through a tower which had been heated to 340° C. and filled with granulated crystalline boron oxide, and mixed with the oxime vapour immediately before the catalyst zone. The catalyst then had deposits of carbon removed from it by heating for 1 hour at 700° C. in air, and was reused for rearrangement. 378.5 g. of cyclohexanone oxime and 75.3 g. of steam saturated with boron oxide were passed over the catalyst, in the manner described, for the next 17 hours. In contrast to the procedure in which the steam was not previously saturated with boron oxide, it was not possible to detect any signs of a reduction in the rearrangement activity of the catalyst. Quantitative determination of the $B_2O_3$ content of the catalyst, as 13.0% by weight, revealed a boron oxide content that showed very little change from the initial value of 12.9% by weight.

|  | Percent |
|---|---|
| Oxime reacted before reactivation | 69.8 |
| Yield of lactam based on oxime reacted | 95.6 |
| Oxime reacted after reactivation | 69.2 |
| Yield of lactam based on oxime reacted | 95.5 |

EXAMPLE 3

(a) Without saturator

A total of 642.8 g. of cyclohexanone oxime in vapour form was passed in a period of 20.7 hours at normal pressure/340° C. over 20 g. of a catalyst consisting of 7.0% by weight of $B_2O_3$ on titanium dioxide, nitrogen being used as carrier gas for the oxime in a quantity of 15 Nl. hour. Before reaching the catalyst zone, this gas stream was admixed with a stream of nitrogen, again in a quantity of 15 Nl./hour, which had been moistened by passing it through a water bottle containing water at 25° C. In this way, 8.9 g. of water were passed over the catalyst together with the oxime during the rearrangement process (corresponding to 1.39% by weight on the quantity of oxime). During the rearrangement cycle, the catalyst was heated four times for 1 hour at 600° C. in air in order to remove carbonaceous deposits from it. On completion of rearrangement, quantitative determination of the $B_2O_3$ content revealed a value of only 4.8% by weight.

|  | Percent |
|---|---|
| Oxime reacted | 92.0 |
| Over-all yield of lactam based on oxime reacted | 93.6 |

(b) With a saturator 648.7 g. of cyclohexanone oxime, together with a stream of nitrogen as carrier gas (15 Nl./hour), were passed in a period of 22.9 hours at normal pressure/340° C. over 20 g. of a catalyst consisting of 7.0% by weight of $B_2O_3$ on titanium dioxide. At the same time, a second stream of nitrogen (15 Nl./hour) was treated with steam at 25° C., passed through a tower which had been heated to 340° C. and filled with granulated crystalline $B_2O_3$, and mixed with the oxime-containing gas stream immediately upstream of the catalyst zone, and the resulting mixture was passed over the catalyst. In this way, 9.4 g. of water (corresponding to 1.45% by weight based on the quantity of oxime) were passed over the catalyst during the rearrangement process. As described in (a), the catalyst was heated four times to remove the deposits from it. On completion of the rearrangement cycle, quantitative analysis revealed a $B_2O_3$ content of 6.6% by weight against 4.8% by weight in the absence of a saturator.

|  | Percent |
|---|---|
| Oxime reacted | 93.8 |
| Over-all yield of lactam based on oxime reacted | 93.9 |

EXAMPLE 4

A layer of 10 g. of catalyst and another layer of 40 g. of crystalline boron oxide were arranged in a reaction tube 2 cm. wide in such a way that the two layers were only separated from one another by a screen. The catalyst consisted of 18% by weight of boron oxide on titanium dioxide as the supporting material, and had a grain size of from 0.6 to 1 mm. The crystalline boron oxide preceding the catalyst layer had a grain size of from 1 to 5 mm. To carry out the rearrangement reaction, the gas mixture of cyclohexanone oxime vapour (22 g./hour), steam (2.3 g./hour) and nitrogen (50 l./hour) was initially passed through the boron oxide layer and then through the catalyst layer, both layers being kept at 320 to 350° C.

The catalyst on which the oxime was rearranged was regenerated at intervals of 12 hours by heating at 600 to 700° C. in air.

During the first 6 hours when the catalyst was still fresh, the oxime conversion amounted to 82% by weight.

After the catalyst had been in use for 36 hours and regenerated for the third time, the oxime conversion over the following 6 hours amounted to 84% by weight.

The yield of lactam based on oxime reacted was similar to these of Examples 1 to 3.

In a comparison test, in which the catalyst layer was not preceded by any crystalline boron oxide, the oxime conversion amounted to less than 10% after only the second regeneration, that is to say after 24 hours.

What we claim is:

1. In the process for the production of caprolactam by passing a gas mixture selected from the group consisting of a mixture of gaseous cyclohexanone oxime and steam and a mixture of gaseous cyclohexanone oxime, steam, and an inert gas over a boron oxide catalyst at temperatures of from 200 to 400° C. and recovering the lactam from the gas mixture thus obtained, the improvement which comprises passing said steam over the X-ray crystalline modification of boron oxide at a temperature of from 200 to 450° C. before passing over said catalyst.

2. The improvement of claim 1, wherein said steam is passed over the X-ray crystalline modification of boron oxide together with said gaseous cyclohexanone oxime at a temperature of from 200 to 400° C.

References Cited

UNITED STATES PATENTS

| 2,392,588 | 1/1946 | Greensfelder et al. | 252—432 |
| 3,154,539 | 10/1964 | Irnich | 260—239.3 |
| 3,210,338 | 10/1965 | Huber et al. | 260—239.3 |

HENRY R. JILES, Primary Examiner

R. T. BOND, Assistant Examiner

U.S. Cl. X.R.

252—432